United States Patent
Geile

(10) Patent No.: US 8,934,556 B2
(45) Date of Patent: Jan. 13, 2015

(54) SYSTEM AND METHOD FOR COMMUNICATING WITH SHAPED CYCLIC TIME-DOMAIN WAVEFORMS

(71) Applicant: Raytheon BBN Technologies Corp., Cambridge, MA (US)

(72) Inventor: Michael Joseph Geile, Bastavia, OH (US)

(73) Assignee: Raytheon BBN Technologies Corp., Cambridge, MA (US)

(*) Notice: Subject to any disclaimer, the term of this patent is extended or adjusted under 35 U.S.C. 154(b) by 50 days.

(21) Appl. No.: 13/864,135

(22) Filed: Apr. 16, 2013

(65) Prior Publication Data

US 2014/0307761 A1    Oct. 16, 2014

(51) Int. Cl.
  *H04L 5/12*    (2006.01)
  *H04L 27/36*    (2006.01)

(52) U.S. Cl.
  CPC .................................. *H04L 27/36* (2013.01)
  USPC ........................................................ 375/261

(58) Field of Classification Search
  USPC ........................................................ 375/261
  See application file for complete search history.

(56) References Cited

U.S. PATENT DOCUMENTS

| | | | |
|---|---|---|---|
| 8,090,037 B1 * | 1/2012 | Harris et al. ................. | 375/260 |
| 2003/0128780 A1 * | 7/2003 | Okamoto ..................... | 375/346 |
| 2006/0072524 A1 * | 4/2006 | Perahia et al. ............... | 370/338 |
| 2009/0041092 A1 * | 2/2009 | Kim et al. .................... | 375/146 |
| 2009/0213969 A1 * | 8/2009 | Hasegawa et al. ........... | 375/343 |
| 2010/0098042 A1 * | 4/2010 | Dent ............................. | 370/342 |
| 2010/0098182 A1 | 4/2010 | Forck et al. | |

FOREIGN PATENT DOCUMENTS

EP    1868336 A2    12/2007

OTHER PUBLICATIONS

"International Application Serial No. PCT/US2014/034149, International Search Report mailed Jul. 18, 2014", 3 pgs.
"International Application Serial No. PCT/US2014/034149, Wiltten Opinion mailed Jul. 18, 2014", 6 pgs.

* cited by examiner

*Primary Examiner* — Santiago Garcia
(74) *Attorney, Agent, or Firm* — Schwegman Lundberg & Woessner, P.A.

(57) ABSTRACT

Embodiments of a system and method for generating a shaped cyclic time-domain waveform are generally described herein. In some embodiments, a first transform may be performed on an input symbol vector to generate a transformed input vector in a transform domain. The transformed input symbol vector may be expanded to generate an expanded symbol vector. At least some elements of the expanded symbol vector may be weighted with a weighting vector selected for pulse shaping to generate a weighted symbol vector. A second transform may be performed on the weighted symbol vector to generate an output symbol vector for subsequent processing and transmission. The second transform may be an inverse of the first transform and may comprise a greater number of points than the first transform.

17 Claims, 3 Drawing Sheets

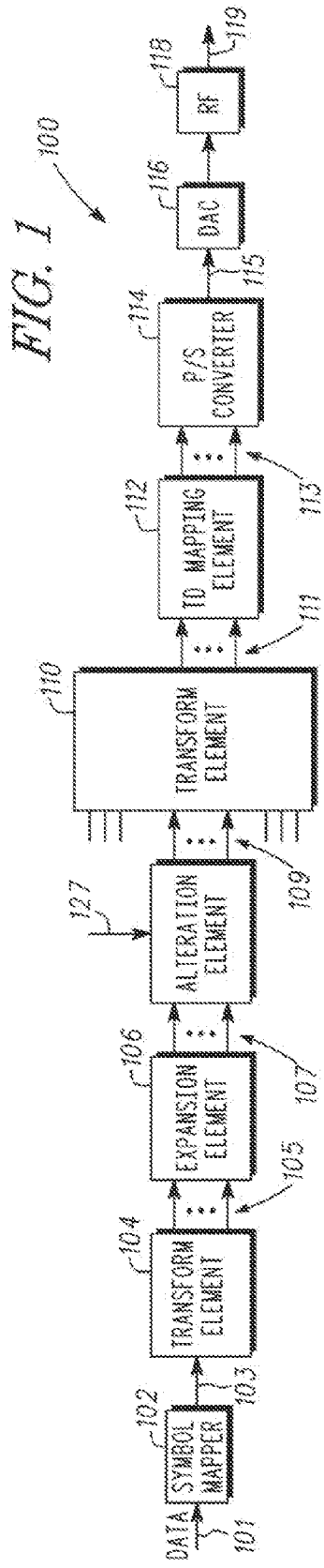
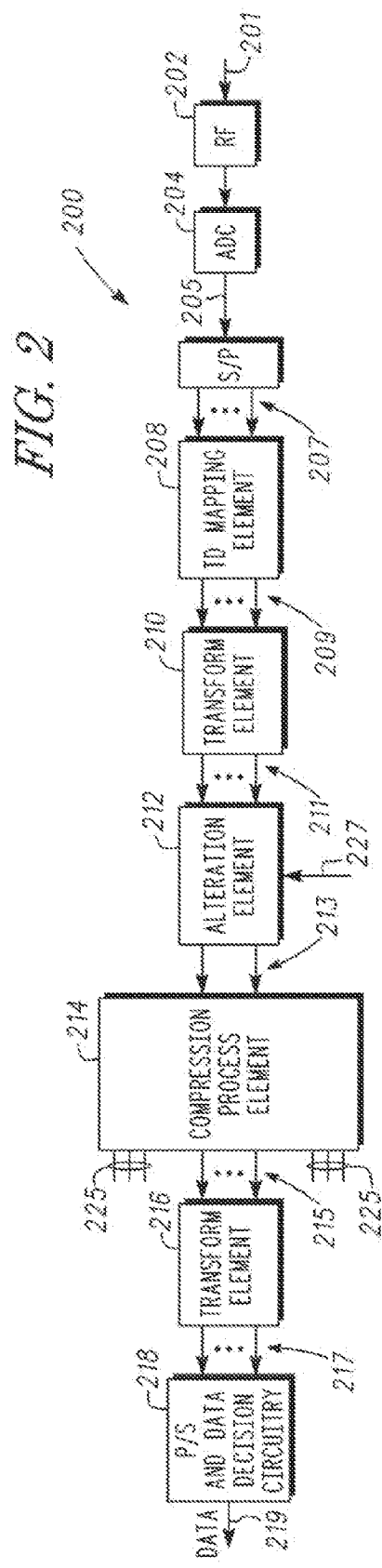

SYSTEM AND METHOD FOR COMMUNICATING WITH SHAPED CYCLIC TIME-DOMAIN WAVEFORMS

TECHNICAL FIELD

Embodiments pertain to wireless communications. Some embodiments relate to communicating with cyclic waveforms. Some embodiments relate to the application of Nyquist cyclic modulation (NCM) to millimeter-wave wireless communications.

BACKGROUND

For wireless communications, it is desirable that the modulation structure be amenable to robust operation and implementation efficiency. The selection of a modulation technique is critical for high rate wireless to support spectrally efficiency, detection efficiency, simplified acquisition, low peak-to-average power ratios (PAPRs), minimal channel dispersion, and reduced implementation complexity.

Thus, there are general needs for improved modulators and demodulators that provide spectral efficiency, detection efficiency, simplified acquisition, low PAPR, minimal channel dispersion, and reduced implementation complexity.

BRIEF DESCRIPTION OF THE DRAWINGS

FIG. 1 is a functional diagram of a cyclic modulator in accordance with some embodiments;

FIG. 2 is a block diagram of a demodulator in accordance with some embodiments;

DETAILED DESCRIPTION

Figure 3:
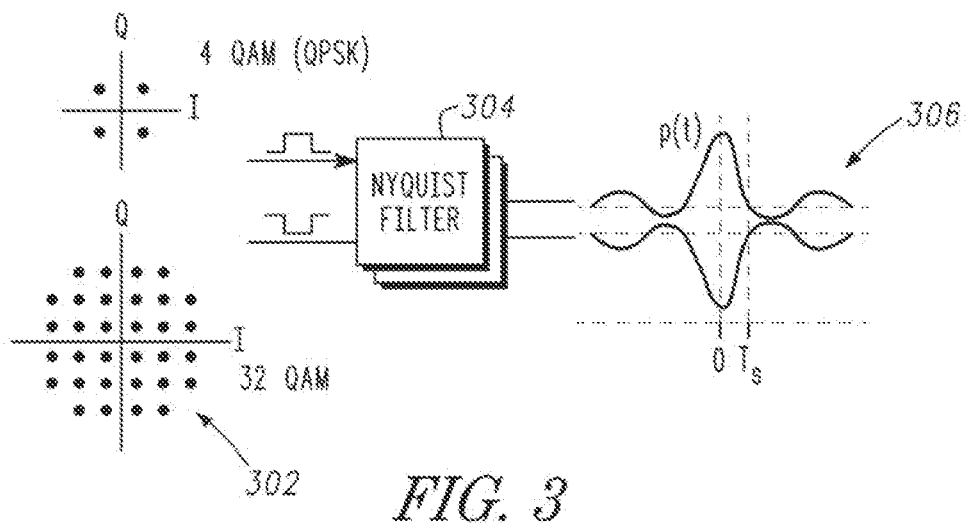
FIG. 3 illustrates Nyquist filtering of complex symbols in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

FIG. 1 is a functional diagram of a cyclic modulator in accordance with some embodiments. Cyclic modulator 100 may be configured to communicate shaped cyclic time-domain waveforms. A demodulator, such as demodulator 200 (FIG. 2), may be used to demodulate signals transmitted by the cyclic modulator 100. As described in more detail below, a process for extending a cyclic block at the modulator 100 and contracting the cyclic block at the demodulator 200 is provided. This process may support shaping of the cyclic blocks for the spectral containment and may support adjustment of signal peak-to-average power ratio, among other things. In some embodiments, the expansion and contraction process may allow mid-frequency domain signal shaping.

In these embodiments, the cyclic modulator 100 may have one or more processing elements arranged to perform a first transform on an input symbol vector 103 to generate a transformed input vector 105 in a transform domain (e.g., the frequency domain). The one or more processing elements may also be arranged to extend the transformed input symbol vector 105 to generate an expanded symbol vector 107 and weight at least some elements of the expanded symbol vector 107 with a weighting vector 127 selected for pulse shaping to generate a weighted symbol vector 109. The one or more processing elements may also be arranged to perform a second transform on the weighted symbol vector 109 to generate an output symbol vector 111 for subsequent processing and transmission. The output symbol vector 111 may comprise a time-domain symbol vector. The second transform may be the inverse of the first transform and the second transform may comprise a greater number of points than the first transform.

After subsequent processing of the output symbol vector 111, cyclic modulator 100 may transmit a shaped cyclic time-domain waveform 119 with one or more antennas. The shaped cyclic time-domain waveform 119 may be a pulse-shaped waveform. These embodiments are described in more detail below.

As illustrated in FIG. 1, the first transform may be performed by transform element 104, the expansion of the transformed input symbol vector 105 may be performed by expansion element 106, the weighting of the elements of the expanded symbol vector 107 may be performed by alteration element 108, and the second transform may be performed by transform element 110.

In some embodiments that implement Nyquist filtered cyclic modulation (NCM), cyclic modulator 100 may transmit an NCM waveform that provides low PAPR, inherent rejection of channel dispersion and reduced acquisition complexity. In some embodiments, a parallel implementation of the cyclic modulator 100 may support multi-gigabit-per-second modems. These embodiments are described in more detail below.

In some embodiments, the first transform (performed by transform element 104) may be an N-point (or N-length) fast-Fourier transform (FFT) to transform the input symbol vector 103 to the frequency domain and the second transform (performed by transform element 110) may be an M-point (or M-length) inverse FFT (IFFT) to transform the expanded symbol vector 107 to the time-domain. In these embodiments M and N are whole numbers and M is greater than N.

In some example embodiments, N may be 64 and M may be 128, although the scope of the embodiments is not limited in this respect as M may be any number greater than N and less than 512, for example. In some embodiments, N may be 64 and M may be around 100. In some embodiments, N may correspond to the number of elements of the input symbol vector 103 and M may correspond to the number of elements of the expanded symbol vector 107 as well as the number of elements of the weighted symbol vector 109. In some embodiments, the symbol vectors may be ordered lists of elements (e.g., tuples).

In some embodiments, transforms other than an FFT for the first transform and an IFFT for the second transform may be used. For example, the first transform may be a discrete Fourier transform (DFT) and the second transform may be an inverse discrete Fourier transform (IDFT).

In accordance with embodiments, to generate the expanded symbol vector 107, the expansion element 106 may be arranged to add at least M-N elements to the transformed input vector 105. In some embodiments, this added expansion may support a larger frequency domain. In some embodiments, each element (instead of just some of the elements) of the expanded symbol vector 107 may be weighted with a weighting vector 127.

Figure 5:
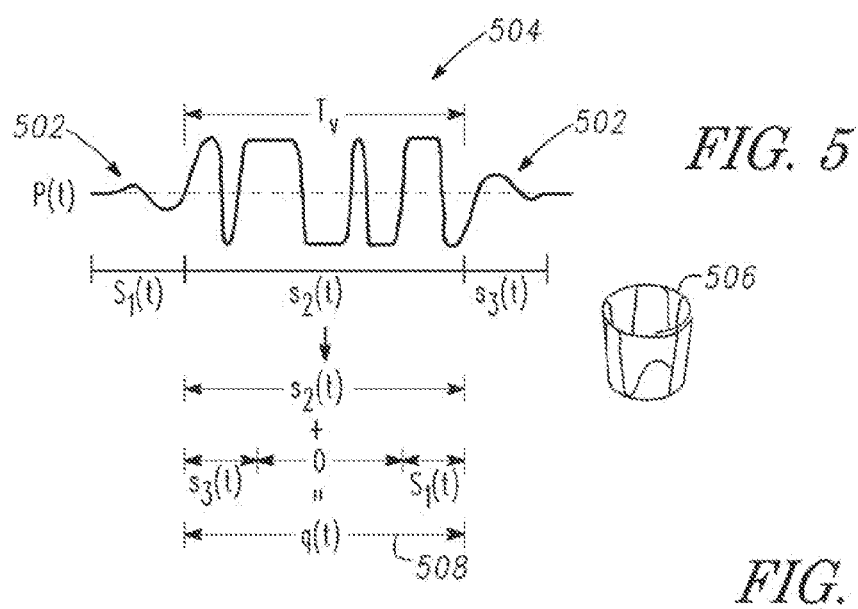
FIG. 5 illustrates the construction of a cyclic symbol vector in accordance with some embodiments.

In some embodiments, the input symbol vector 103 may comprise quadrature-amplitude modulation (QAM) symbols or modulation pulses. To generate the expanded symbol vector 107, the expansion element 106 may be arranged to cyclically extend the transformed input vector 105 by adding symbol content outside a central symbol vector to generate a resultant cyclic symbol vector q(t) (i.e., the expanded symbol vector 107). Examples of this are illustrated in FIG. 5 described below. The resultant cyclic symbol vector q(t) may correspond to a circular convolution of the QAM symbols with a Nyquist filter response.

In some embodiments, to weight at least some elements of the expanded symbol vector 107, the alteration element 108 may be arranged to perform a root-Nyquist filtering process by complex vector multiplication in the frequency domain. In these embodiments, the weights of weighting vector 127 may be selected to perform Nyquist shaping in accordance with the Nyquist filter response (i.e., for NCM). Other shaping, such as Butterworth shaping, may alternatively be performed.

In some embodiments, some weights of the weighting vector 127 may have a zero value and some weights having non-zero values. In these embodiments, the non-zero valued weights may be applied to elements that are to be operated on by the second transform.

In accordance with some embodiments, a filter with finite time-domain support may be used as part of the filtering process performed by alteration element 108. In this way, after filtering, the inverse transform of the weighted frequency domain signal (i.e., the second transform performed by transform element 110) may result in a filtered time-domain signal where the transients (of infinite extent) will appear to have wrapped into the symbol vector in a cyclic manner. In these embodiments, the extent of the frequency domain filter representation may be limited to approximate a filter with greater frequency support (e.g., those frequencies where the values of the filter are non-zero). In these embodiments, the original filter may be non-zero over a larger range but is approximated with a filter that is shorter (e.g., zero over an extended frequency range).

In some embodiments, the expansion of the transformed input vector 105 (i.e., by expansion element 106) to generate the expanded symbol vector 107 may comprise extending an aperture in the frequency domain. In these embodiments, an aperture may refer to a segment of samples that may be considered significant. For example, when there are 64 points in the first transform output, the frequency domain aperture may have a length of 64 (i.e., 64 samples). When there are 128 points in the second transform, the second transform may have an aperture of length 128 (i.e., 128 samples). The expansion added by expansion element 106 may establish a map between these two apertures that behaves in a manner that is desirable for a particular application (e.g., to perform well controlled filtering).

In some embodiments, the modulation symbols that comprise output symbol vector 111 as presented by the second transform may be twice oversampled.

In some embodiments, the one or more processing elements of the cyclic modulator 100 may further be arranged to apply a mapping to the output symbol vector 111 to generate a parallel set of output time samples 113. In these embodiments, the mapping applied to the output symbol vector 111 may be applied by time-domain (TD) mapping element 112.

In some embodiments, the output symbol vector 111 may comprise an in-phase signal (I) and quadrature signal (Q) (i.e., complex modulation symbols). The mapping that is applied may be arranged to cyclically extend the output symbol vector 111 (which is a time-domain symbol vector) and cyclically shift the quadrature signal by one-half symbol from the in-phase signal to produce an offset modulated signal block corresponding to the output time samples 113.

The output time samples 113 may be converted from parallel to serial form by parallel-to-serial (P/S) converter 114 to generate time samples 115 (e.g., baseband signals) which may be converted to analog form by digital-to-analog converter (DAC) 116 for subsequent up-conversion to RF signals by RF circuitry 118 and for transmission by one or more antennas.

As further illustrated in FIG. 1, prior to performance of the first transform by transform element 104, a data stream 101 may be converted to parallel form and may undergo a bit-to-symbol mapping process to generate the input symbol vector 103. Modulation formats may include standard modulation formats (e.g., PSK and QAM formats) as well as offset modulation formats.

FIG. 2 is a block diagram of a demodulator in accordance with some embodiments. Demodulator 200 may be suitable for the demodulation of a shaped cyclic time-domain waveform that may have been transmitted by a cyclic modulator, such as cyclic modulator 100 (FIG. 1), although the scope of the embodiments is not limited in this respect. In some embodiments, cyclic modulator 100 and demodulator 200 may comprise a modem or may be part of a wireless communication system.

In accordance with embodiments, the demodulator 200 may comprise one or more processing elements arranged to perform a third transform on a time-domain symbol vector 209 generated from a received signal 201. The third transform may convert the time-domain symbol vector 209 to a frequency-domain representation 211. The processing elements of the demodulator 200 may also be arranged to perform a frequency-domain weighting at least some elements of the frequency-domain representation 211 (e.g., by application of a weighting vector 227) to generate a weighted symbol vector 213, and perform a compression process on the weighted symbol vector 213 to produce a corrected symbol vector 215 having a reduce number of elements (i.e., symbols). The processing elements of the demodulator 200 may also be arranged to perform a fourth transform on only some elements of the corrected symbol vector 215 to generate an output signal vector 217 that is an estimate of transmitted modulation symbols. The third transform may be an inverse of the fourth transform and the third transform may comprise a greater number of points than the fourth transform.

In these embodiments, frequency-domain weighting may be performed by alteration element 212 and may be responsible for matched recovery and equalization of general time-domain symbol pulse shapes. In some embodiments, the third transform may be performed by transform element 210, the compression process may be performed by compression process element 214, and the fourth transform may be performed by fourth transform element 216. In these embodiments, the compression process may compress the number of values being processed.

In some embodiments, the third transform (i.e., performed by transform element 210) may be an inverse of the second transform (i.e., performed by transform element 110 of the cyclic modulator 100 (FIG. 1)) and has the same number of points as the second transform. The fourth transform (i.e., performed by transform element 216) may be an inverse of the first transform (i.e., performed by transform element 104 of the cyclic modulator 100) and may have the same number of points as the first transform although the scope of the embodiments is not limited in this respect.

In some alternate embodiments, the fourth transform (i.e., performed by transform element 216) may have a different number of points as the first transform (i.e., performed by transform element 104). In these alternate embodiments, the fourth transform may be an M-point size transform (e.g., rather than an N-point size transform) to detect and equalize the offset symbols.

In some embodiments, the processing elements of the demodulator 200 may also be arranged to discard the elements 225 of the corrected symbol vector 215 that are not to be operated on by the fourth transform. The elements that are retained may correspond to the elements that were added by the expansion element 106 of the cyclic modulator 100.

In some embodiments, the compression process element 214 may support a reduction of samples for more efficient recovery processing. As illustrated in FIG. 2, compression process element 214 may operate on the weighted symbol vector 213, which may have M elements, however this is not a requirement as the compression process element 214 may operate on a subset of these elements (e.g., N elements of vector 213).

In some embodiments, the third transform may be an M-point FFT, and the fourth transform is an N-point IFFT. M and N may be whole numbers and M may be greater than N.

In some embodiments, the frequency-domain weighting (i.e., performed by the alternation element 212) may apply a mapping that cyclically filters the signal (i.e., the frequency-domain representation 211). In some embodiments, the mapping may act as an adaptive frequency-domain filter or equalizer.

In some embodiments, the demodulator 200 may also include time-domain mapping element 208 to apply a mapping to a received time-domain signal 207 to produce the time-domain symbol vector 209 for performance of the third transform thereon. In these embodiments, the mapping applied to the received time-domain signal 207 may be a time-domain format process performed by the time-domain mapping element 208. In some embodiments, the mapping applied to received time-domain signal 207 may be an inverse of the mapping applied by time-domain mapping element 112 (FIG. 1) of the cyclic modulator 100 (FIG. 1). In some embodiments, the mapping may identify and remove a cyclic extension from the received time-domain signal 207 and may cyclically shift the quadrature component of the baseband waveform by one-half symbol (e.g., relative to the in-phase component) to map an offset modulation to a non-offset format to produce symbol vector 209.

As illustrated in FIG. 2, demodulator 200 may also include RF recovery circuitry 202 to process the received RF signal 201 and analog-to-digital converter (ADC) 204 to perform filtering and convert the received signal to digital baseband samples 205. Serial-to-parallel (S/P) converter 206 may generate the received time-domain signal 207 from the baseband samples 205. Demodulator 200 may also include P/S converter and data decision circuitry 218 to generate decision values from the output signal vector 217 for mapping to the output data 219. Although not specifically discussed, demodulator 200 may be configured to compensate for frequency offset induced by the RF, as well as address cyclic vector alignment in accordance with conventional techniques.

FIG. 3 illustrates Nyquist filtering of complex symbols in accordance with some embodiments. As shown in FIG. 3, pulses scaled with a QAM constellation 302 (e.g., 4-QAM (i.e., QPSK) or 32 QAM) may be Nyquist filtered by Nyquist filter 304 to produce a complex pulse train 306. In practice, the Nyquist filter 304 may be divided into root-Nyquist filters that may serve to band limit and pulse shape at the transmitter (e.g., cyclic modulator 100 (FIG. 1)) and act as the matched filter at the receiver (e.g., demodulator 200 (FIG. 2)). In these embodiments, the Nyquist filters exhibit a property that the modulation bandwidth is well constrained and there is little or no inter-symbol interference (ISI) at the symbol sampling instance. The pulses may be sampled at two-samples per symbol to help avoid interpolation in recovery and the D/A reconstruction filters may be specifically configured depending on the Nyquist shape factor. Nyquist pulses have a well contained spectrum and zero ISI at the sample instance. As illustrated in FIG. 3, pulses cross zero at the adjacent symbol peaks.

Figure 4:
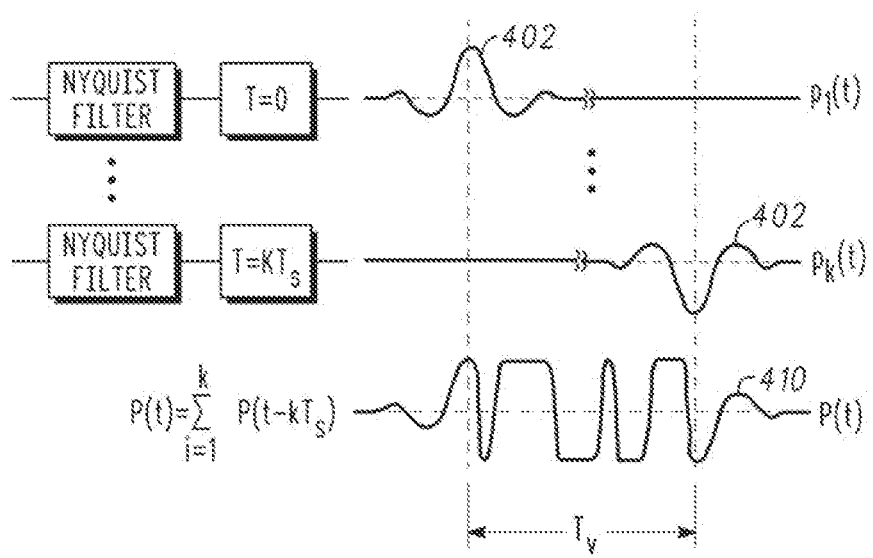
FIG. 4 illustrates the forming of a symbol vector by summing a collection of delayed Nyquist pulses in accordance with some embodiments.

FIG. 4 illustrates the forming of a symbol vector by summing a collection of delayed Nyquist pulses in accordance with some embodiments. As illustrated in FIG. 4, an ensemble of k complex Nyquist pulses 402 may be combined to generate a signal P(t) 410. The real part of the pulses $p_k(t)$ is represented in the figure. As illustrated, delayed versions of the pulses are added to define a symbol vector. FIG. 4 shows that that the Nyquist pulses create controlled ISI within a symbol vector and filter transients at the edges of the symbol vectors create interference between adjacent symbol vectors. Note that the signal P(t) 410 is notional as the sketch does not show ISI. An output symbol vector for transmission by cyclic modulator 100 (FIG. 1) may be formed by summing a collection of k delayed Nyquist pulses.

FIG. 5 illustrates the construction of a cyclic symbol vector in accordance with some embodiments. A cyclic symbol vector may be identified by adding in the symbol transients 502 outside of the central symbol vector 504. This can be envisioned as wrapping the symbol vector around a cylinder 506 of circumference equal to and then adding the portions that overlap onto the base symbol. The resultant cyclic symbol vector q(t) 508 may equivalently be formed by circular convolution of the QAM modulation pulses with a Nyquist filter.

Cyclic symbol vector q(t) 508 may be constructed by summing the filter transients $s_1(t)$ and $s_3(t)$ 502 into the base symbol interval $s_2(t)$ 504. Cyclic symbol vector q(t) 508 may also be generated by cyclically convolving the filter response with the complex modulation pulses. The cyclic symbol vectors may be cyclically extended (by the TD mapping element 112 (FIG. 1)) prior to transmission by sending a segment, $\tilde{q}_k(t)$, from the end of the symbol prior to the base symbol, $q_k(t)$.

Figure 6:
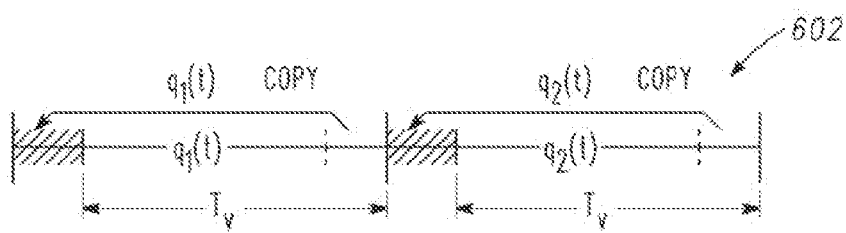
FIG. 6 illustrates a train of cyclically extended symbol vectors in accordance with some embodiments.

FIG. 6 illustrates a train of train of cyclically extended symbol vectors in accordance with some embodiments. The train of cyclically extended symbol vectors 602 may be transmitted by the cyclic modulator 100 (FIG. 1). This demonstrative waveform construction may be useful to illustrate the structural properties of the NCM waveform, which may be transmitted by cyclic modulator 100.

Referring to FIG. 1, in accordance with some embodiments, the cyclic modulator 100 may accept a set of data streams that are serialized then presented to an encoder, such as a forward-error correcting (FEC) encoder. A pseudo-random sequence generator may be used to sustain channel operation, scramble user data, and for testing. A preamble (e.g., a symbol vector pilot) may be periodically inserted in the stream. The resulting bit stream (i.e., data stream 101) may be converted to QAM symbols by symbol mapper 102 then presented to an N-length Fast Fourier Transform (FFT) in transform element 104. Information in the transform domain may be cyclically expanded by expansion element 106 and then root-Nyquist filtered in the frequency domain by alteration element 108. In these embodiments, the root-Nyquist filtering may be a complex vector multiplication as opposed to a time-domain convolution and so it is more efficient. The frequency domain vector may be transformed into a cyclic symbol vector via an M-length inverse FFT by transform element 110 (i.e., M may be greater than N). A guard interval is added (i.e., time domain cyclic extension) by time-domain mapping element 112 and the result may be serialized (by P/S converter 114). In some embodiments, dual D/A converters may be used produce a baseband signal representation that is transmitted via RF circuitry 118. In these embodiments, cyclic modulator 100 may generate a cyclic waveform as described above in which the first transform element 104, the expansion element 106, the alteration element 108, and the second transform element 110 are configured to efficiently operate on parallel streams. In an example embodiment in which M is 128 and N is 64, the symbol vector 103 may contains 64 modulation symbols represented at 2 samples per symbol. For a symbol rate of 5 GHz, the cyclic modulator 100 may produce symbol vectors at a 5 GHz÷N which is a 78 MHz rate.

In accordance with embodiments, the demodulator 200 (FIG. 2) may accept quadrature samples and the acquisition process establishes basic timing alignment and frequency error from the cyclic extension in accordance with conventional techniques. The frequency may be tracked continuously and sample timing adjusted by varying integral sample delay and fractional sample tracking as a linear phase shift yielding a uniform, adjustable group delay in an adaptive frequency domain equalizer. Given alignment to within the extended cyclic symbol vector, a subset of samples may be converted to parallel format (e.g., by S/P converter 206) and processed through an M-length FFT (e.g. by transform element 210). Matched root-Nyquist filtering may be performed by the alteration element 108 along with compensation for other known circuit dispersion (e.g., D/A and A/D converter droop and analog baseband filter effects). This adaptive equalization process performed by the alteration element 108 may help mitigate cyclic ISI. The equalized vector output may be reduced to the N-length IFFT (by transform element 216) and eventually streamed to a symbol-to-bit mapper to generate demodulated symbols which may be FEC decoded then formatted for a user interface.

In some embodiments, the modulator and demodulator architecture illustrated in FIGS. 1 and 2 may be replicated and the channels interconnected to support subband processing with spatial multiplexing techniques. In some embodiments, the acquisition process applies pilot symbol vectors to sound the channel and estimates the channel matrix at the discrete frequencies. Channel variations for different modem deployments may vary. Channel dynamics in airborne collection applications may be estimated for compensation updates at a 10 Hz rate. Therefore, channel estimation and correction matrix computations may be addressable in a signal processor.

Figure 7:
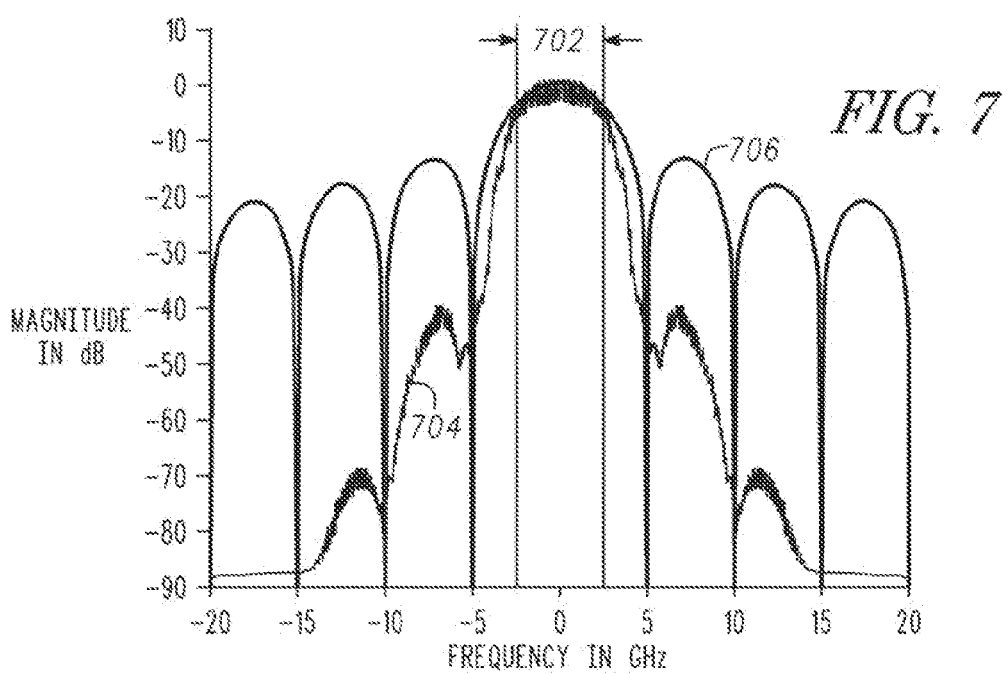
FIG. 7 illustrates an estimate of WIN analog power spectral density in accordance with some embodiments.

FIG. 7 illustrates an estimate of NCM analog power spectral density in accordance with some embodiments. As discussed above, the cyclic structure may be applied in the modulator to control ISI and mitigate the impact of the RF dispersion. Residual dispersion may be addressed by the cyclic extension and adaptive equalization. Consider a signal that carries 25 Gbps using 32 QAM and operates at a 5 GHz symbol rate and a 10 GHz sample rate. An estimate of the NCM analog power spectral density 704 is shown in FIG. 7. The spectrum passband of 5 GHz 702 occurs at about the −5 dB point of the spectrum. The Sin(x)x shaped curve 706 is included in the plot for comparison and represents a spectrum with no filtering applied.

Although cyclic modulator 100 (FIG. 1) and demodulator 200 (FIG. 2) are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, a modem for a MODEM for millimeter-wave communications is provided. In these embodiments, the modem may comprise one or more processing elements arranged to perform a first N-point FFT on an input symbol vector of QAM symbols to generate a transformed input vector in a transform domain, cyclically extend the transformed input symbol vector by adding symbol content outside a central symbol vector to generate an expanded symbol vector, weight at least some elements of the expanded symbol vector with a weighting vector selected for pulse shaping to generate a weighted symbol vector, perform an M-point IFFT on the weighted symbol vector to generate an output symbol vector for subsequent processing and transmission, and apply a mapping to the output symbol vector to generate a parallel set of output time samples.

In these embodiments, M may be greater than N. To weight at least some elements of the expanded symbol vector, the one or more processing elements may be arranged to perform a root-Nyquist filtering process by complex vector multiplication in the frequency domain.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, system 100 may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A system for communicating using shaped cyclic time-domain waveforms comprising a cyclic modulator having one or more processing elements arranged to:

perform a first transform on an input symbol vector to generate a transformed input vector in a frequency domain;

extend the transformed input symbol vector in the frequency domain to generate an expanded symbol vector;

weight, in the frequency domain, at least some elements of the expanded symbol vector with a weighting vector selected for Nyquist-pulse shaping to generate a weighted symbol vector; and perform a second transform on the weighted symbol vector to generate an output symbol vector for subsequent processing and transmission, the output symbol vector comprising a time-domain symbol vector, wherein the second transform is an inverse of the first transform and the second transform comprises a greater number of points than the first transform, and wherein extending the transformed input symbol vector in the frequency domain creates an extended frequency domain aperture to allow weighting of additional elements of the expanded symbol vector to allow the time-domain symbol vector to become a Nyquist-filtered waveform with a low peak-to-average power ratio (PAPR).

2. The system of claim 1 wherein the first transform is an N-point fast-Fourier transform (FFT) to transform the input symbol vector to the frequency domain and the second transform is an M-point inverse FFT (IFFT) to transform the expanded symbol vector to the time-domain, wherein M is greater than N, and wherein to generate the expanded symbol vector, the one or more processing elements is arranged to add at least M-N elements to the transformed input vector.

3. The system of claim 2 wherein the input symbol vector comprises quadrature-amplitude modulation (QAM) symbols, wherein to generate the expanded symbol vector, the one or more processing elements are configurable to cyclically extend the transformed input vector by adding symbol content outside a central symbol vector to generate a resultant cyclic symbol vector, and wherein the resultant cyclic symbol vector corresponds to a circular convolution of the QAM symbols with a Nyquist filter response.

4. The system of claim 3 wherein to weight at least some elements of the expanded symbol vector, the one or more processing elements are arranged to perform a root-Nyquist filtering process by complex vector multiplication in the frequency domain.

5. The system of claim 4 wherein the expansion of the transformed input vector to generate the expanded symbol vector comprises extending an aperture in the frequency domain creating the extended frequency domain aperture.

6. The system of claim 4 wherein the processing elements are further arranged to apply a mapping to the output symbol vector to generate a parallel set of output time samples.

7. The system of claim 6 wherein the output symbol vector comprises an in-phase signal (I) and quadrature signal (Q), and wherein the mapping that is applied is arranged to cyclically extend the output symbol vector and cyclically shift the quadrature signal by one-half symbol from the in-phase signal to produce an offset modulated signal block corresponding to the output time samples.

8. A system for communicating using shaped cyclic time-domain waveforms comprising a cyclic modulator having one or more processing elements arranged to:

perform a first transform on an input symbol vector to generate a transformed input vector in a transform domain;

extend the transformed input symbol vector to generate an expanded symbol vector;

weight at least some elements of the expanded symbol vector with a weighting vector selected for pulse shaping to generate a weighted symbol vector; and perform a second transform on the weighted symbol vector to generate an output symbol vector for subsequent processing and transmission, the output symbol vector comprising a time-domain symbol vector, wherein the second transform is an inverse of the first transform and the second transform comprises a greater number of points than the first transform, wherein the system further comprises a demodulator comprising one or more processing elements arranged to:

perform a third transform on a time-domain symbol vector generated from a received signal comprising a shaped cyclic time-domain waveform, the third transform to convert the time-domain symbol vector to a frequency-domain representation;

perform a frequency-domain weighting at least some elements of the frequency-domain representation to generate a weighted symbol vector;

perform a compression process on the weighted symbol vector to produce a corrected symbol vector having a reduced number of elements; and perform a fourth transform on only some elements of the corrected symbol vector to generate an output signal vector that is an estimate of transmitted modulation symbols, wherein the third transform is an inverse of the fourth transform and the third transform comprises a greater number of points than the fourth transform.

9. The system of claim 8 wherein the third transform is an inverse of the second transform and has the same number of points as the second transform, and wherein the fourth transform is an inverse of the first transform and has a same number of points as the first transform.

10. The system of claim 8 wherein the one or more processing elements of the demodulator is further arranged to discard elements of the corrected symbol vector that are not operated on by the fourth transform.

11. The system of claim 10 wherein the third transform is an M-point FFT and the fourth transform is an N-point IFFT, and wherein M is greater than N.

12. The system of claim 11 wherein the frequency-domain weighting applies a mapping for cyclical filtering.

13. The system of claim 12, wherein the one or more processing elements of the demodulator are further arranged to apply a mapping to a received time-domain signal to produce the time-domain symbol vector for performance of the third transform thereon.

14. A method for generating a shaped cyclic time-domain waveform comprising:

performing a first N-point fast-Fourier transform (FFT) on an input symbol vector of QAM symbols to generate a transformed input vector in a frequency domain;

cyclically extending the transformed input symbol vector in the frequency domain by adding symbol content outside a central symbol vector to generate an expanded symbol vector;

weighting, in the frequency domain, at least some elements of the expanded symbol vector with a weighting vector selected for Nyquist-pulse shaping to generate a weighted symbol vector;

performing an M-point inverse FFT (IFFT) on the weighted symbol vector to generate an output symbol vector for subsequent processing and transmission, the output symbol vector comprising a time-domain symbol vector, and applying a mapping to the output symbol vector to generate a parallel set of output time samples, wherein M is greater than N, and wherein extending the transformed input symbol vector in the frequency domain creates an extended frequency domain aperture to allow weighting of additional elements of the expanded symbol vector to allow the time-domain symbol vector to become a Nyquist-filtered waveform with a low peak-to-average power ratio (PAPR).

15. The method of claim 14 wherein weighting comprising performing a root-Nyquist filtering process by complex vector multiplication in the frequency domain.

16. A MODEM for millimeter-wave communications comprising one or more processing elements arranged to:

perform a first N-point fast-Fourier transform (FFT) on an input symbol vector of quadrature-amplitude modulation (QAM) symbols to generate a transformed input vector in a frequency domain;

cyclically extend the transformed input symbol vector in the frequency domain by adding symbol content outside a central symbol vector to generate an expanded symbol vector;

weight, in the frequency domain, at least some elements of the expanded symbol vector with a weighting vector selected for Nyquist-pulse shaping to generate a weighted symbol vector;

perform an M-point inverse FFT (IFFT) on the weighted symbol vector to generate an output symbol vector for subsequent processing and transmission, the output symbol vector comprising a time-domain symbol vector, and apply a mapping to the output symbol vector to generate a parallel set of output time samples, wherein M is greater than N, and wherein to weight at least some elements of the expanded symbol vector, the one or more processing elements are arranged to perform a root-Nyquist filtering process by complex vector multiplication in the frequency domain, and wherein extending the transformed input symbol vector in the frequency domain creates an extended frequency domain aperture to allow weighting of additional elements of the expanded symbol vector to allow the time-domain symbol vector to become a Nyquist-filtered waveform with a low peak-to-average power ratio (PAPR).

17. A MODEM for millimeter-wave communications comprising one or more processing elements arranged to:

perform a first N-point fast-Fourier transform (FFT) on an input symbol vector of quadrature-amplitude modulation (QAM) symbols to generate a transformed input vector in a transform domain;

cyclically extend the transformed input symbol vector by adding symbol content outside a central symbol vector to generate an expanded symbol vector;

weight at least some elements of the expanded symbol vector with a weighting vector selected for pulse shaping to generate a weighted symbol vector;

perform an M-point inverse FFT (IFFT) on the weighted symbol vector to generate an output symbol vector for subsequent processing and transmission, the output symbol vector comprising a time-domain symbol vector, and apply a mapping to the output symbol vector to generate a parallel set of output time samples, wherein M is greater than N, wherein to weight at least some elements of the expanded symbol vector, the one or more processing elements are arranged to perform a root-Nyquist filtering process by complex vector multiplication in the frequency domain, and wherein the one or more processing elements are further arranged to:

perform an M-point FFT on a time-domain symbol vector generated from a received signal comprising a shaped cyclic time-domain waveform, the third transform to convert the time-domain symbol vector to a frequency-domain representation;

perform a frequency-domain weighting at least some elements of the frequency-domain representation to generate a weighted symbol vector;

perform a compression process on the weighted symbol vector to produce a corrected symbol vector having a reduced number of elements; and perform a N-point IFFT on only some elements of the corrected symbol vector to generate an output signal vector that is an estimate of transmitted modulation symbols; and discard elements of the corrected symbol vector that are not operated on by the fourth transform.

* * * * *

UNITED STATES PATENT AND TRADEMARK OFFICE
CERTIFICATE OF CORRECTION

PATENT NO. : 8,934,556 B2  Page 1 of 1
APPLICATION NO. : 13/864135
DATED : January 13, 2015
INVENTOR(S) : Geile It is certified that error appears in the above-identified patent and that said Letters Patent is hereby corrected as shown below:

In the specification

Column 1, line 42, delete "WIN" and insert --NCM--, therefor

Column 4, line 11, before "baseband", insert --digital--, therefor

Column 6, line 37, after "to", insert --$T_v$--, therefor

Column 7, line 19, before "symbol", insert --input--, therefor

Signed and Sealed this
Twenty-sixth Day of January, 2016

Michelle K. Lee
*Director of the United States Patent and Trademark Office*